Oct. 28, 1969  W. H. WHITE, JR  3,475,745

LIQUID LEVEL INDICATOR

Filed Jan. 9, 1967

Inventor
WILLIAM HERBERT WHITE JR.
BY Mueller, Aichele & Rauner

ATTYS.

United States Patent Office 3,475,745
Patented Oct. 28, 1969

3,475,745
LIQUID LEVEL INDICATOR
William Herbert White, Jr., Wheaton, Ill., assignor to Motorola, Inc., Franklin Park, Ill., a corporation of Illinois
Filed Jan. 9, 1967, Ser. No. 608,032
Int. Cl. G08b *21/00*
U.S. Cl. 340—253          7 Claims

ABSTRACT OF THE DISCLOSURE

This circuit utilizes a normal condition indicating lamp that is series connected to an abnormal condition indicating lamp. A thermistor is connected between the lamps in parallel relationship to the normal condition indicating lamp. Under normal conditions the current through the lamp is sufficient to light the normal lamp but will not light the abnormal light. The thermistor is exposed upon the liquid level dropping below the normal condition to divert current from the normal condition indicating lamp thereby causing an increase in current in the abnormal condition lamp to light it.

BACKGROUND OF THE INVENTION

This invention relates to normal-abnormal indicating circuits and particularly to those indicating circuits utilizing a heat responsive element for indicating liquid levels within a container.

It is known that a thermistor may be used to indicate liquid levels. The electrical resistance of an NTC thermistor varies inversely with its temperature. For a liquid level sensing device, for example, the temperature of a thermistor will increase greatly due to self-heating when a liquid level falls below a level sensing thermistor. This is especially true in those systems wherein an electrical heater is used to heat the thermistor, and the liquid conducts heat away from the thermistor. Such devices have been used in coolant systems of automobiles.

For proper maintenance of a machine having a desired liquid level, it is important to know when the liquid level indicator is inoperative. Such indicators often have two lamps, one indicating normal conditions and another indicating abnormal conditions. Filaments within the indicating lamps may burn out or open causing a malfunction within the indicator when the liquid level still may be normal. The heater element or the thermistor element may also become defective. It is desired to require all components in the indicator system plus a normal liquid level before a normal condition is indicated.

SUMMARY

It is an object of this invention to provide a simple, electrically operated, fluid level indicating system which provides for checking and indicating the operativeness of the component parts of the system in addition to indicating normal or abnormal liquid levels.

According to this invention an abnormal condition indicating lamp and a normal condition indicating lamp are connected in series circuit relationship. Normally current will flow through the series circuit and the lamps are constructed such that the normal lamp will light up or incandesce while the abnormal lamp will remain unlit. A thermistor is connected between the lamps in parallel circuit relationship to the normal condition indicating lamp. Normally the thermistor is at such a high impedance that insubstantial current will flow therethrough. In a liquid level detecting system, normally the liquid will carry heat away from the NTC thermistor keeping it at the high impedance. However, when the liquid level falls below the thermistor, it will heat up, lowering its impedance for diverting current away from the normal condition indicating lamp. Increased current then causes the abnormal condition indicating lamp to incandesce. To speed up response of the indicator system an electrical heater is in thermal conductive relationship to the thermistor.

An open circuit in the normal lamp filament causes the abnormal lamp to incandesce. When the normal indicating filament burns out opening the normal indicating circuit, current is forced to flow through the thermistor. This additional current through the thermistor will cause it to heat up, lowering its impedance. The resulting increased current then heats the abnormal condition indicating lamp filament to incandescence.

Electro-responsive switch means are provided in operative relationship to the heater circuit. The switch is in the series circuit with the normal condition indicating lamp. When the switch means senses a predetermined change in heater current, such as caused by the shorting or opening of the heater element, it will open the normal condition indicating lamp circuit for forcing the abnormal lamp to incandesce.

When the abnormal lamp filament burns out, the lamp circuit is completely broken extinguishing both lamps.

Manual switch means are also provided in the circuit for testing the operation thereof.

DESCRIPTION OF THE PREFERRED EMBODIMENTS

Figure 1:
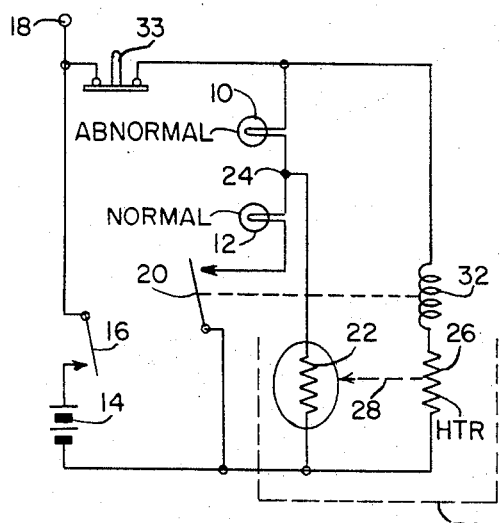
FIG. 1 illustrates a first exemplary embodiment of the subject invention.

Referring now more particularly to the figures, like numbers indicate like parts and structural features of various schematic diagrams. The various diagrams illustrate the same indicating circuit with variations in the detection of inoperative or abnormally operating component parts.

The indicating circuits includes abnormal indicating lamp 10 connected in series circuit with normal condition indicating lamp 12. Current is supplied by a battery or other source 14 through switch 16, which may be an automobile on-off switch. Battery 14 current and voltage is provided to other parts of the automobile or device (not shown) through terminal 18. During normal conditions current flows through a circuit from battery 14 through lamps 10 and 12 and an electro-responsive switch means, such as switch part 20. Lamps 10 and 12 are constructed such that the normal current therethrough will light or incandesce normal condition indicating lamp 12 while abnormal condition indicating lamp 10 remains below incandescence. A thermistor 22 is connected at junction 24 between lamps 10 and 12 and to one side of battery 14 in a parallel circuit relation to lamp 12 as shown. A heater 26 is connected across the series circuit including lamps 10 and 12 and is in thermal conductive association with thermistor 22 as indicated by arrow 28. When thermistor 22 and heater 26 are immersed in a liquid container, indicated schematically by dotted lines 30, the liquid acts to conduct heat away from thermistor 22 such that the thermal connection, indicated by arrow 28, is effectively reduced. This operation keeps thermistor 22 at a low temperature for maintaining its high impedance. However, if the liquid is removed from the container, the thermoconductivity is effectively increased for raising the temperature of thermistor 22. Its resistance greatly decreases effectively shorting out lamp 12. Increased current then flows through lamp 10 and thermistor 22 for heating lamp 10 into incandescence. Having generally described the indicator circuit, the illustrated variations will now be described.

Referring particularly now to FIG. 1 there is shown an indicator circuit which indicates an open circuit in heater 26. A switch actuating coil 28 is connected in series circuit with heater 26. Coil 28 is operatively associated with switch 20 for closing the switch whenever heater 26 draws its normal current amplitude. When heater 26 has an open circuit, coil 28 releases switch 20, opening the circuit of the normal condition indicating lamp 12, for lighting abnormal lamp 10 as aforedescribed. Reset switch 33 is provided to reset the circuit to normal after an abnormal condition has been removed. For example, upon restoration of a normal liquid level, the latent heat in thermistor 22 with the heater 26 still heating lamp 10 may remain at incandescence unless the circuit is reset.

Figure 2:
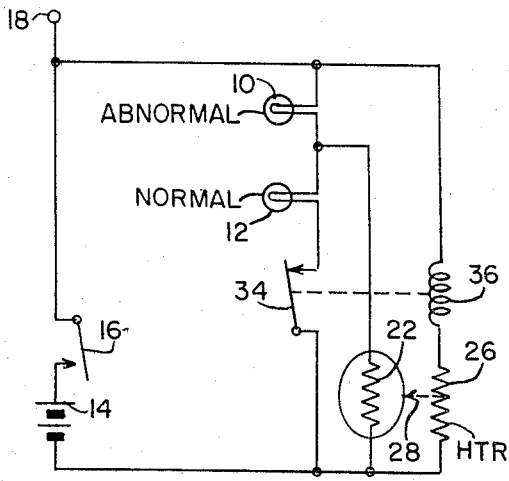
FIG. 2 illustrates a modification of the FIG. 1 embodiment.

FIG. 2 illustrates another embodiment for indicating when heater 26 is shorted. Normally closed switch part 34 is connected in series circuit with normal lamp 12. An actuating coil 36 is connected in series circuit with heater 26. With normal heater current, coil 36 remains deactivated. However, upon a short in heater 26, the current through coil 36 increases sufficiently to actuate the coil 36 into opening switch part 34, disconnecting normal condition indicating lamp 12. Abnormal condition indicating lamp 10 then lights indicating there is an inoperative component, i.e., heater 26 is shorted to ground. A reset switch (not shown) also may be provided for this embodiment.

Figure 3:
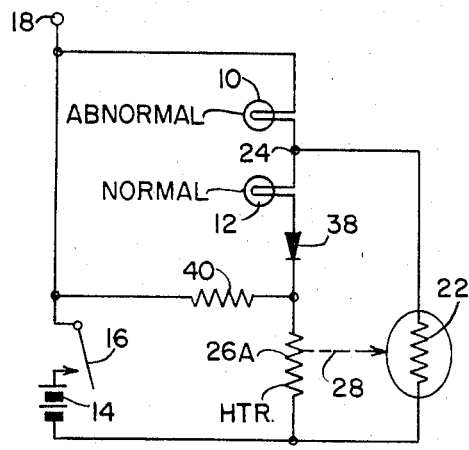
FIG. 3 shows a second exemplary embodiment of the subject invention.

FIG. 3 illustrates an indicator circuit having a semiconductor diode 38 connecting normal condition indicating lamp 12 to a heater 26A. Diode 38 acts as an electro-responsive switch for extinguishing normal lamp 12 whenever heater 26 has an open circuit. Under normal conditions current will flow from source 14 through abnormal lamp 10, normal lamp 12, diode 38 and heater 26A. The current amplitude is such that lamp 12 will incandesce while lamp 10 will not. Additional current for heater 26A may be provided through resistor 40. Upon an open circuit occurring in heater 26A, diode 38 prevents current from flowing through resistor 40 into normal lamp 12.

If heater 26A shorts to ground, then current flowing through lamp 10, lamp 12 and diode 38 will greatly increase such that both lamps 10 and 12 will incandesce, indicating a heater short.

In the FIG. 3 circuit normal lamp 12 being lit indicates that current source 14 is supplying current through closed switch 16, the abnormal lamp 10 filament is intact, the thermistor 22 has a high impedance (the liquid level is normal) and the heater 26A is operating in a normal condition.

Figure 4:
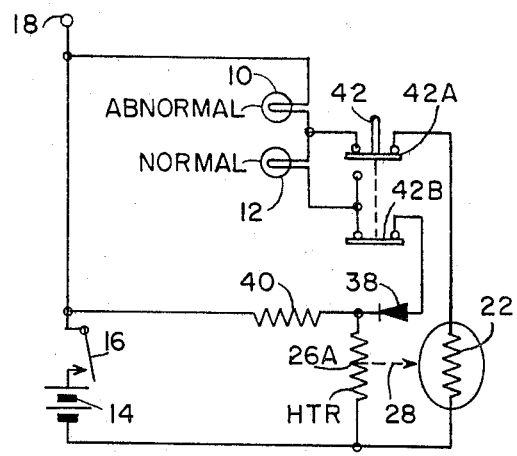
FIG. 4 is a modification of the FIG. 3 embodiment.

The FIG. 4 embodiment of the indicator circuit adds switch 42, having switch parts 42A and 42B, for selective manual testing of the indicator circuit. With the switches set as shown, operation is as described for the FIG. 3 embodiment. By resetting switch 42, diode 38 is disconnected from lamp 12 while the series circuit consisting of lamps 10 and 12 are connected through thermistor 22. The current through lamps 10 and 12 is sufficient to heat thermistor 22 for lowering its electrical impedance to light both lamps. Additionally, the current through resistor 40 continues to flow through heater 26A for supplying heat to thermistor 22. Switch 42 may be the start switch of an automobile. This test indicates both lamps are operative, source 14 is supplying current, thermistor 22 and 26A are operative.

What is claimed is:
1. An indicator circuit, including in combination,
normal and abnormal condition indicating lamps connected in a series circuit relation and forming a connection therebetween,
a thermistor electrically coupled to said connection and being in a parallel circuit relation with respect to said normal indicating lamp,
electric heater means in an effectively variable thermal conductive association with the thermistor, and
electro-responsive switch means connected to said normal lamp and responsively connected to the heater means for selectively blocking current from flowing through said normal lamp whenever the heater means current undergoes a predetermined change in amplitude.

2. The combination of claim 1 wherein said switch means includes an inductance coil magnetically coupled to a switch part, the switch part being in series circuit with the normal lamp, and wherein said switch part is actuated by the coil in response to a predetermined current flowing through the heater means.

3. The combination of claim 2 wherein the switch part is normally open and the current through the heater means actuates the inductance coil for closing the normally open switch part during normal heater operation.

4. The combination of claim 3 further including a reset switch connected in series circuit with said abnormal lamp and said heater means and wherein said heater means and said coil are in a series circuit that is in parallel circuit relation to said lamps.

5. The combination of claim 2 wherein the switch part is normally closed and wherein excessive current through the heater means causes the coil to open the switch part.

6. The combination of claim 1 wherein the heater means is in series circuit relation to said lamps, and the switch means is a unidirectional current conducting device in series circuit relation with said lamps and the heater means and electrically interposed between the heater means and said lamps and poled to conduct current in a first direction, and a resistor connected in parallel circuit to said lamps and said switch means for passing additional current to the heater means in said first direction.

7. The combination of claim 6 further including test switch means operative upon actuation to disconnect the heater means from said lamps and reconnect the lamps in a series circuit relation to the thermistor whereby both lamps incandesce and the heater means continues to operate.

References Cited

UNITED STATES PATENTS 2,736,884    2/1956    Yeomans _____ 340—228 XR

JOHN W. CALDWELL, Primary Examiner
DANIEL K. MYER, Assistant Examiner

U.S. Cl. X.R.
317—41; 340—59, 214, 228, 244